April 27, 1965 R. BEAU 3,180,812
PROCESS FOR THE MANUFACTURE OF INDIUM OF HIGH PURITY
Filed April 10, 1961
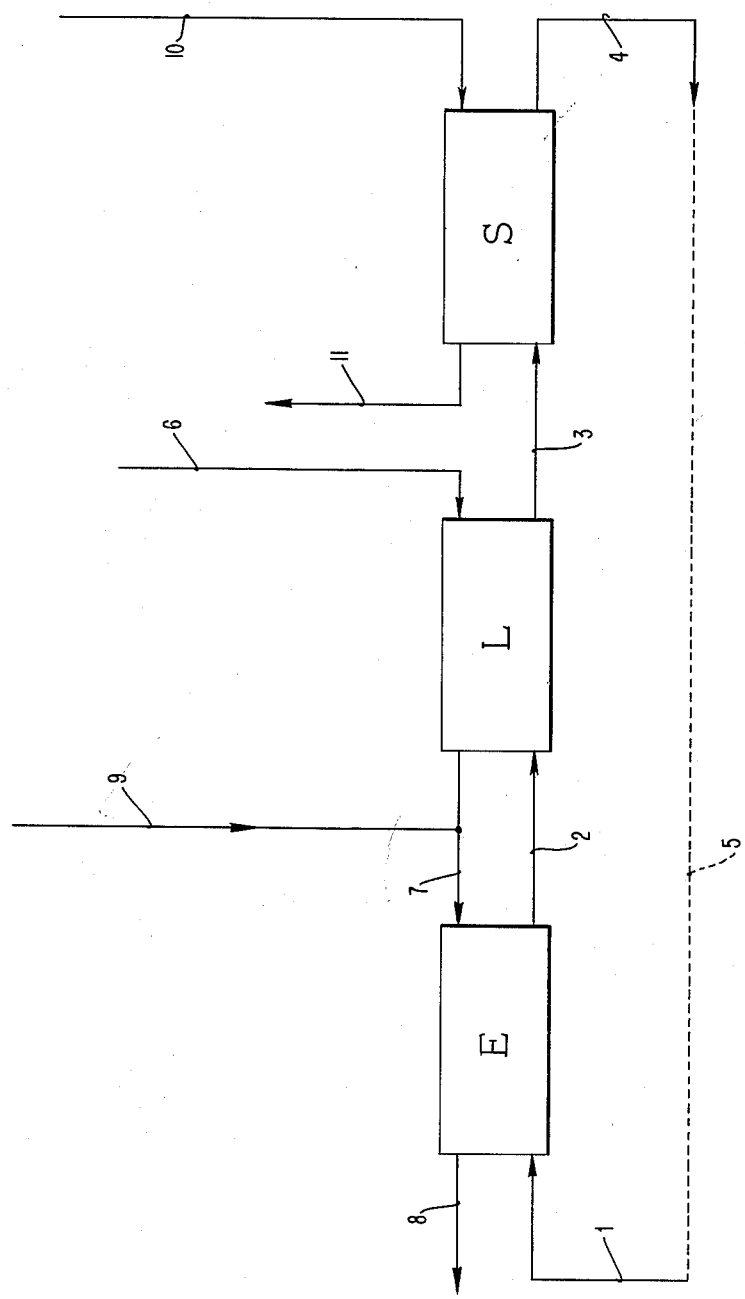
INVENTOR.
RAYMOND BEAU
BY Bauer and Seymour
ATTORNEYS

United States Patent Office 3,180,812
Patented Apr. 27, 1965

3,180,812
PROCESS FOR THE MANUFACTURE OF
INDIUM OF HIGH PURITY
Raymond Beau, Massy, Seine-et-Oise, France, assignor to Societe Anonyme les Produits Semi-Conducteurs, Paris, France
Filed Apr. 10, 1961, Ser. No. 101,716
Claims priority, application France, Feb. 20, 1961, 853,268
9 Claims. (Cl. 204—105)

This invention relates to an improvement in the purification of indium, and it relates more particularly to the production of solutions of indium chloride freed from impurities and capable of electrolysis with the production of metallic indium of high purity.

It is known that the manufacture of binary or ternary semi-conductors requires the use of metals of extreme purity. It is usual to purify these metals by physical or chemical means so as to bring them to a degree of purity around 99.999%. Then, when such means are no longer sufficient to further diminish the content of impurities, to carry out an ultimate purification by zonal fusion, a process used for example for antimony, bismuth and tin. It is very difficult to purify indium by that method because the coefficients of separation of the usual impurities found with indium are too close to one.

To attain a high degree of purity for indium intended for zonal purification it has been proposed to use electrolytic methods such as refining with a soluble indium anode or electrolysis with an insoluble anode in solutions of indium chloride or sulfate. Now, in all these cases, it has been found that three metals thallium, cadmium and nickel cannot be satisfactorily removed by electrolysis, their potential of deposit being too close to that of indium.

It is an object of this invention to produce indium of high purity.

Another object is to prepare indium so that it may be subjected to electrolysis in the substantial absence of metals which have a closely related potential of deposit.

Another object is to prepare metallic indium which is immediately useful in the manufacture of semi-conductors.

Another object is to produce indium by a novel process which avoids the imperfections of the prior art.

The objects of the invention are accomplished, generally speaking, by dissolving impure indium in concentrated hydrochloric acid, mixing the resulting solution with a polybutyl phosphate containing an organic diluent, and in a first separation separating the organic phase containing indium from the acid phase containing impurities, mixing the organic phase from said separation with concentrated HCl and in a second separation separating the acid phase containing impurities from the organic phase containing indium chloride, mixing the organic phase from the second separation with an aqueous solvent for indium chloride and in a third separation isolating the aqueous solution of indium chloride from the organic phase, and subjecting the isolated aqueous solution to electrolysis, thereby producing indium of high purity.

The process according to the invention has as its essential steps submitting a solution of indium chloride in concentrated HCl to methodical extraction by the aid of butyl phosphate, particularly dibutyl or tributyl phosphate, which are preferably diluted by an organic solvent which separates the largest part of thallium, nickel and cadmium, which remain in the aqueous hydrochloric acid phase. The indium is retained in the organic phase and is freed from the last traces of thallium, cadmium and nickel by a concentrated aqueous solution of hydrochloric acid. The indium chloride is then extracted from the organic phase with aqueous medium, usually water or dilute hydrochloric acid. The aqueous solution may be subjected to electrolysis for the deposition of pure indium.

According to the invention the free acidity of the hydrochloric acid solutions of indium chloride which are submitted to extraction by butyl phosphate correspond, in preference, at best to the maximum of the coefficient of separation of indium between the extracting liquid and the hydrochloric phase. The optimum free acidity is between 7 and 11 N, and preferably between 8 and 10 N. Furthermore, being given that this coefficient of separation tends to decrease as the concentration of indium increases, it has been established that the concentration of indium in the aqueous phase should not in practice exceed 40 to 50 grams of indium per liter. Such hydrochloric solutions of indium may be prepared by attacking metallic indium of about 99.5% purity by means of concentrated HCl. One establishes these solutions at the desired concentration by adding HCl or indium, taking into consideration the conditions under which they are introduced to the apparatus of extraction.

The extracting liquid is constituted by dibutyl phosphate and/or tributyl phosphate but the extractive power of those liquids is preferably diminished with respect to indium and the metal impurities found with it by dilution with an organic solvent inert to the indium and its impurities, and these are preferably of the hydrocarbon class including the hydrocarbons themselves and their halogenated derivatives such as benzene, toluene, chlorobenzene, and the aliphatic hydrocarbons such as those derived from petroleum. I have established that one differentiates best the coefficients of separation of indium on the one hand and its impurities on the other, by utilizing organic solutions of dibutyl or tributyl phosphates in which the phosphate is 30 to 50% by weight of the extracting solution.

The extraction preferably comprises the agitation of the aqueous hydrochloric acid solution of indium with the organic extracting liquid in a plurality of successive operations, for instance according to the method of the identified application. The indium integrally passes into the organic phase while the thallium, which becomes monovalent under the HCl attack, the cadmium, the nickel as well as other impurities such as lead, copper, bismuth and pentavalent arsenic largely remain in the aqueous phase according to their individual coefficients of separation under these conditions. Not only indium but other metals whose separation by subsequent electrolysis offers no difficulties pass into the organic phase, including principally iron, antimony and trivalent arsenic. In practice to attain the best conditions of extraction it has been found that equal use of the organic and aqueous phases is efficient.

In accordance with the invention the extraction is followed by washing the organic phase with concentrated hydrochloric acid, an operation which is also carried out in successive stages according to the identified case. One may advantageously use hydrochloric acid of a concentration between 8 and 11 N and preferably between 10 and 11 N. During the course of this washing or extracting the small quantities of thallium, cadmium and nickel which pass with indium into the organic phase, taken finally into the aqueous phase, entrain only very small proportions of indium which may, if desired, be recovered by recycling the solution.

After decantation and separation of the organic phase (in which will be found practically the totality of the indium and those metals such as tin, arsenic, antimony and iron which have substantially the same coefficients of separation as indium), the organic phase is subjected to elution either with pure water or dilute hydrochloric acid between 0.1 and 0.5 N. During the course of elution which may also be carried out in successive stages, the indium and its accompanying metals pass substantially integrally into the aqueous phase.

The operations of extraction, washing and elution, as above described, may also be carried out by simple extraction, by extraction according to the method of Vanatabe and particularly, by the method of O'Keeffe, in appropriate apparatus such as filled columns, pulsating columns, mixer-settler, and the like. Nevertheless, the best results from the point of view of yield and rate of separation are obtained by using the extraction apparatus described in the identified application. The use of that apparatus is particularly advantageous in the present case because it permits the association in a single apparatus of all the stages of extraction, washing and elution.

The aqueous solution of indium chloride purified by the process of the invention may be submitted to electrolysis, either during, or after transformation of chlorides to sulfates, in order to obtain metallic indium. This electrolysis is carried out in sulfuric medium in a manner already known. It is particularly advantageous to do the electrolysis at variable potential so as to recover on a first cathode the impurities less electro-negative than indium, such as lead, bismuth, copper, tin, silver, mercury, arsenic and antimony, to the extent that these metals are found present in the electrolyte, and then to continue the electrolysis at high potential to recover all the indium present; the metals more electro-negative than indium such as zinc, iron and aluminum, will remain in the electrolyte. The very pure indium is then detached from the cathode and may be used directly for the manufacture of semi-conductors.

The example which follows is described in relation to the drawing. The drawing is a diagram or flow sheet of the operation.

*Example*

A hydrochloric acid solution of indium chloride is prepared by dissolving impure indium (preferably about 99.5% pure) in concentrated HCl at elevated temperature. In indium of this degree of contamination the following impurities are to be expected:

| | Parts per million |
|---|---|
| Lead | 460 |
| Copper | 300 |
| Cadmium | 4,000 |
| Nickel | 310 |
| Zinc | 4,250 |
| Thallium | 360 |
| Silver | 300 |
| Arsenic | 2.5 |

After cooling, the solution has a free acidity of about 6.5 N and it contains about 200 g./liter of indium metal. One applies to 5 liters of this solution the counter-current method of extraction of O'Keeffe using as the extractor liquid 25 liters of a mixture containing 40 parts by weight of tributyl phosphate with 60 parts by weight of benzene. When the extraction hereinabove called washing is carried out one uses 25 liters of 10 N HCl. When the extraction called hereinabove elution is carried out one uses 25 liters of 0.5 N HCl.

When one uses the apparatus described in the identified case, it is satisfactory to employ five stages of extraction, ten stages of washing with concentrated acid, and five stages of elution. The apparatus is represented schematically in the drawing in which the rectangle E stands for all the stages of extraction, the rectangle L represents all the stages of washing, and rectangle S represents all the stages of elution. The organic liquid penetrates the apparatus at one of its extremities through the conduit 1 and passes through the stages of E, thence through conduit 2 to the stages of L, thence through the conduit 3 to the stages of S from whence it is discharged and recycled through conduit 5 to be used again.

During its travel through the apparatus the organic liquid successively engages counter-current in the following operations:

In apparatus E the organic solution extracts the indium from concentrated hydrochloric acid solution. In the apparatus L the organic solution of indium encounters concentrated HCl which removes thallium, cadmium and nickel. In the apparatus S the organic solution of indium gives up the indium to dilute HCl.

The hydrochloric acid solution of indium enters the circuit by conduit 9 and is mixed with the concentrated hydrochloric acid passing from apparatus L to E through conduit 7. Thus, the .5 liters of indium hydrochloric solution are added to the 25 liters of 10 N HCl. The aqueous HCl phase of indium chloride thus has a free acidity between 9 and 10 N and an indium content on the order of 33 g./liter, which is augmented by the introduction of indium entrained by the washing and which is recovered, thus raising the content to about 40 g./liter.

The conduit 6 introduces 10 N hydrochloric acid to the apparatus L. The conduit 10 introduces the dilute acid to the apparatus S to carry out the step of elution. The aqueous solution of indium chloride is extracted from the apparatus through conduit 11.

There is thus obtained in 80 hours 25 liters of an aqueous solution of indium chloride containing 40 g./liter of metallic indium, which means that the 1000 grams of indium introduced into the extractor will be found substantially completely recovered after the purification.

The solution of indium chloride is transformed to sulfate by evaporation to dryness and solution in 66° volume sulfuric acid. The indium sulfate solution is adjusted at 200 g./liter of indium at a pH of 1 to 1.5. This solution is electrolyzed at first under a cathode potential of $-560$ millivolts as measured on a saturated calomel electrode, for 24 hours, the current density mean being 0.05 milliampere/cm.$^2$. In this first phase of electrolysis there is deposited the metals which are nobler than indium. After charging the cathode the potential is raised to $-700$ millivolts and the current to about 2 milliamperes/cm.$^2$ for 6 days. There is thus deposited on the cathode $9/10$ of the indium present in the electrolyte. The indium detached from the cathode is melted and yields the following analysis:

| | Parts per million |
|---|---|
| Lead | 2.5 |
| Copper | 1 |
| Cadmium | <1 |
| Nickel | <1 |
| Zinc | <1 |
| Thallium | <0.5 |
| Silver | <1 |
| Arsenic | 1 |
| Bismuth | <1.5 |

This indium is of very high purity and is useful in the manufacture of semi-conductors.

The advantages of the invention are the production of high purity indium in a system which is highly efficient and substantially free from loss. Another advantage is the attainment of the objects of the invention. Other advantages are apparent from the reading of the case. The reagents used and the individual steps required are not unusual or complex.

As many apparently widely different embodiments of the present invention may be made without departing from the spirit and scope thereof, it is to be understood that the invention is not limited to the specific embodiments.

What is claimed is:.

1. A method of preparing indium of high purity which comprises dissolving indium and associated impurities in concentrated hydrochloric acid, extracting the indium from the solution and removing it from some of the impurities by means of an alkyl salt of phosphoric acid in organic medium, extracting residual impurities from the organic solution by means of concentrated hydrochloric acid, extracting indium salt from the organic phase by means of aqueous liquid, and subjecting the aqueous liquid to electrolysis, thereby producing indium of high purity.

2. A method of preparing indium of high purity which comprises dissolving impure indium in concentrated HCl, mixing the resulting solution with a polybutyl phosphate containing an organic diluent, and in a first separation separating the organic phase containing indium from the acid phase containing impurities, mixing the organic phase from said separation with concentrated HCl and in a second separation separating the acid phase containing impurities from the organic phase containing indium chloride, mixing the organic phase from the second separation with an aqueous solvent for indium chloride and in a third separation isolating the aqueous solution of indium chloride from the organic phase, and subjecting the isolated aqueous solution to electrolysis, thereby producing indium of high purity.

3. A method according to claim 2 in which the free acidity of the initial solution in concentrated HCl is between about 7 and 11 N.

4. A method according to claim 3 in which the normality is between 8 and 10.

5. A method according to claim 2 in which the concentration of indium in the concentrated acid phase is not over 50 g./liter.

6. A method according to claim 2 in which the diluent for the butyl phosphate is a hydrocarbon.

7. A method according to claim 2 in which the concentration of the organic solvent is about 30-50% of the weight of the solvent plus the diluent.

8. A method according to claim 2 in which the organic phase from said operation, containing indium, is washed with HCl solution of normality between 8 and 11.

9. A method according to claim 8 in which the normality is between 10 and 11.

References Cited by the Examiner
UNITED STATES PATENTS

| | | | |
|---|---|---|---|
| 1,839,800 | 1/32 | Murray | 204—105 |
| 1,912,590 | 6/33 | Murray | 204—105 |
| 2,238,437 | 4/41 | Zischkan | 75—121 |
| 2,384,610 | 9/45 | Doran et al. | 75—121 |
| 2,695,227 | 11/54 | Lebedeff | 75—121 |
| 2,812,233 | 11/57 | Lewis et al. | 23—312 |
| 2,902,454 | 9/59 | Moore | 23—312 |
| 2,955,913 | 10/60 | Peppard | 23—312 |
| 2,992,894 | 7/61 | Hazen et al. | 23—312 |

FOREIGN PATENTS

| | | |
|---|---|---|
| 128,613 | 5/60 | Russia. |
| 800,153 | 8/58 | Great Britain. |

OTHER REFERENCES

J. Inorg. and Nuclear Chem. 10:306–18 (1959), Chem. Abst. No. 53:17745a.

West: Laboratory Methods, April 1956, pages 185–188.

JOHN H. MACK, *Primary Examiner.*

JOSEPH REBOLD, MURRAY TILLMAN, *Examiners.*